3,216,980
POLYMER DERIVATIVES OF 1,3-PROPANE-
SULTAM
Carl John Berg, St. Paul, Minn., assignor to Minnesota
Mining and Manufacturing Company, St. Paul, Minn.,
a corporation of Delaware
No Drawing. Filed Sept. 11, 1961, Ser. No. 137,032
13 Claims. (Cl. 260—79.3)

This invention relates to novel derivatives of polymeric substances and particularly to alkyl and acyl derivatives of poly-1,3-propanesultam and to a process for the formation thereof.

Poly-1,3-propanesultam is a high-melting linear polysulfonamide containing a number of repeating units as shown by the general formula:

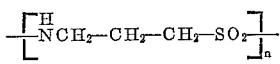

wherein $n$ is an integral number. A given polymer ordinarily contains several molecular species in each of which $n$ has an integral value. The polymer and its production are disclosed in United States Patent 2,983,713.

It is an object of this invention to provide polypropanesultam having modified properties. Other objects will become evident hereinafter.

In accordance with above and other objects of the invention it has been found that polypropanesultam can be modified by treating it with alkylating agents to incorporate alkyl groups into the molecule, in numbers up to about equal with the number of nitrogen atoms present in the sulfonamide linkages. It has further been found that introduction of alkyl groups to form the products of the invention is readily effected by reaction of the polymer in the form of the salt, as in strongly basic solution, with an alkylating agent.

The new alkylated polypropanesultams of the invention may accordingly be designated generically as polymers derived from propanesultam in which from about 5 to 100 percent of the hydrogen atoms upon the nitrogen atoms in the chain thereof have been replaced by an alkyl radical.

The term "alkyl radical" as used herein means alkyl radicals having from 1 to 18 carbon atoms and includes alkyl radicals connected through a carbonyl group as well as substituted alkyl radicals. Substituents of the alkyl radicals which are illustrative include cyano, hydroxy, alkoxy, aryl, halo, polyoxyalkylene, carboxy, carboalkoxy, haloaryl, nitroaryl and the like groups, as well as the presence of unsaturation.

The alkylating process may be carried out with compatible mixed alkylating agents or in two steps, first alkylating to a predetermined percentage, for example, about 5 to 50 percent, using one alkylating agent and then to a second predetermined percentage using a second alkylating agent. In this way, the properties of the polymer may be varied still further.

Thus, the alkylated polymers can also be defined as alkylated polypropanesultams in which from about 5 to 100 percent of the hydrogen atoms upon the nitrogen atoms in the chain thereof have been replaced by at least one radical of the group consisting of alkyl, hydroxyalkoxyalkyl, alkenyl, cyanoalkyl, hydroxyalkyl, carboxyalkyl, carboalkoxyalkyl, haloalkyl, aralkyl, nitroaralkyl and acyl radicals.

The alkylated polymers of the invention have significantly different properties as compared with the original polypropanesultam. Polypropanesultam melts at about 250–260° C. or even somewhat higher, the actual temperature determined being somewhat dependent, as is known, on the method of determination, thermometer corrections, rate of heating, etc. as well as the particular properties of the polymer, which may vary somewhat from lot to lot. The presence of catalyst or incomplete drying may lower the melting point several degrees; pure, anhydrous polypropanesultam has the highest melting point. Generally speaking, alkylation brings about a reduction in melting point, whereby the melting point of the alkylated polymer exhibits a noticeable lowering after alkylation to the extent of a few percent, and appears to reach a minimum at about 70 to 90 percent alkylation.

Replacement of as few as about 5 percent of the hydrogen atoms on the nitrogen atoms in the polymer chain with alkyl groups produces a marked change in the rate of alkali-solubility of the polymer. At the same time, the dielectric constant is increased, except in the case of those alkylated polypropanesultams which are water-soluble.

The elastic modulus of the polymer is changed in a way similar to solubility in alkali, in that it falls to a minimum at about 40 to 70 percent alkylation. By appropriate selection of alkylating agents as hereinafter noted, more elastic polymers can be produced, including elastomers with good recovery after elongation.

By alkylation of the surfaces of shaped polypropanesultam articles, as explained in more detail herein, the surface properties of the articles can be significantly changed. Thus, rubbery surfaces and surfaces having good adherence for ink, adhesives and the like can be produced.

The alkylation of polypropanesultam is conveniently carried out in solution in a strong base. From the weight of polymer employed, the amount of alkylating agent to be used to provide the predetermined percentage of alkylation can be estimated by the usual method based on stoichiometry, and for lower percentages, the desired percent of the equivalent amount is used. When the alkylation is to be relatively high in proportion, and approaching complete alkylation, the use of solvents such as dimethyl sulfoxide, and an excess of the alkylating agent, will be found to be useful. The process is then carried out under conventional conditions for alkylation. In many instances, the alkylated polymer precipitates from solution. In other cases, it is recovered by acidifying the reaction mixture. After washing and drying, the alkylated polymer is ready for fabrication, as by melt extrusion, molding, etc.

In general, it is found that aqueous solutions of strong bases, as exemplified by sodium or potassium hydroxide, will dissolve polypropanesultam to produce viscous solutions. Anhydrous organic bases, such as tetramethylguanidine, tetramethylammonium hydroxide and the like can also be used. Further it is found that solutions can be made in dimethylsulfoxide. Because solutions of polypropanesultam tend to have high viscosities, it is generally preferred to work with fairly dilute solutions containing from about 5 to 20 percent by weight of polypropanesultam; but concentrations outside of this range as low as 1 or 2 percent and up to 30 or even 40 percent may be used when the mechanical difficulties of handling the larger volumes of dilute solution or of handling the more viscous solutions are of no concern.

If desired, shaped articles of polypropanesultam, such as films, filaments or molded objects, can be treated in the solid state with an alkylating agent, under alkaline conditions, or in the presence of catalytic solvents such as dimethyl sulfoxide. This surface treatment is facilitated by a small amount of bulk alkylation before shaping. A modification of the surface is thus effected, without changing the interior portions of the articles.

The alkylating agents employed in the process are N-alkylating agents; e.g., such as those which react with a sodium salt of a sulfonamide to produce an N-alkyl sulfonamide. Among such agents which have been found effective mention may be made of dialkyl sulfates such as dimethyl, diethyl, dibutyl sulfates and the like; alkyl sulfonates, such as methyl p-toluenesulfonate, n-butyl p-toluene sulfonate, dodecyl benzenesulfonate, cinnamyl benzene sulfonate, and the like; acrylonitrile, methyl methacrylate, methyl acrylate and other acrylate and methacrylate esters; alpha-bromo esters such as methylbromoacetate; propanesultone, β-chloroethyl alkyl ethers, alkyl and aralkyl halides such as myristyl bromide, stearyl bromide and ethyl iodide; allyl halides such as allyl chloride or methallyl chloride, benzyl chloride and the like; and oxirane compounds such as ethylene oxide, propylene oxide, decylene oxide and the like.

Thus, by employing alkylating agents of the type described it is found to be possible to introduce not only simple alkyl groups of 1 to about 18 carbon atoms, but also substituted alkyl groups such as cyanoethyl, hydroxyethyl, alkoxyethyl, carboxymethyl, benzyl and the like groups. The variously modified polypropanesultams, referred to as polyalkyl polypropanesultams for convenience, show an interesting range of properties depending on the particular modifying alkyl group.

Acylation may be effected within the scope of the invention by employing anhydrous dimethylsulfoxide solutions of polypropanesultam and the desired aliphatic, aromatic or mixed anhydride or acid halide, such as acetic anhydride, benzoyl chloride or cinnamoyl chloride, together with a base such as pyridine.

It has also been found that more than one type of such group can be employed with the same polymer; for example, a polymer of which say 5 percent of the N atoms are methylated can be benzylated so that part of or all of the remaining N atoms are benzylated. Previous N-alkylation with low molecular weight agents, such as N-methylation to a small degree, of the order of 5–10 percent, renders further alkylation of the polymer relatively easier, particularly where higher molecular weight alkylating agents are used.

The products of the invention are useful, for example, as coating material to produce particular surface effects such as hydrophilicity or hydrophobicity. They are also useful for the production of filaments and as casting resins where high termal stability is desired. They can be used to give orientable films which are oriented by stretching from 200 to 400 percent at about 200° F.

Having thus described the invention and process for producing the compositions of the invention in broad terms, it is now more specifically illustrated and described by particular examples showing the best mode contemplated of practicing the invention. In these examples all parts are by weight unless otherwise stated and inherent viscosities are determined by conventional procedures, using 5 percent aqueous sodium hydroxide as a solvent, at 25° C. Temperatures are expressed in degrees centigrade.

As noted, it is found that the melting point of polypropanesultam is about 250° to 260° C. or somewhat higher and is substantially independent of the molecular weight as indicated by the inherent viscosity. The processes of this invention are equally applicable to these polymeric materials of all molecular weights. The ultimately intended use will normally dictate molecular weights desired. So far as can be determined, the process of the invention does not materially alter the molecular weight, but increasing percentages of alkylation, in the broad sense of the word, tend to result in lowering of the melting point to a minimum point at about 70–90 percent, thereafter rising again to a temperature generally lower than the original melting point. The following examples serve to illustrate the process of the invention applied to alkylate polypropanesultam of various molecular weights to various extents.

EXAMPLE 1

To a solution of 11.7 parts of sodium hydroxide in 230 parts of water in a high speed mixer (Waring Blendor) are added 35.4 parts of polypropanesultam having an inherent viscosity of about 1.2. After vigorous agitation a rather viscous solution is produced. Stirring is continued and 5.52 parts of dimethyl sulfate (15 mole percent) are added dropwise. During about 4 minutes the temperature rises from 32.5° C. to 35° C. and stirring is continued for about 35 minutes. The viscous solution is transferred to a large beaker, diluted with about 500 parts of water and acidified by gradual addition of 5 percent hydrochloric acid with manual stirring. The polymer precipitates and addition of acid is continued until the suspension of polymer is still acid after standing 5 minutes. The polymer is recovered by centrifugation. It is washed repeatedly with water and is dried at about 30° C. under 6 to 10 mm. Hg pressure. The polymer thus obtained is approximately 15 percent methylated polypropanesultam. The dry methylated polypropanesultam melts at about 227° to 230° C.

To a solution of 3 parts (0.025 mole) of polypropanesultam (inherent viscosity about 0.45) in 10 parts by volume of 13 percent sodium hydroxide solution (0.03 mole) are added 3.76 parts of dimethyl sulfate (0.030 mole) while stirring in a Waring Blendor at 30° C. There is an exothermic reaction to 50° C. with formation of a cake of polymer. After cooling, ammonia is added to react with excess dimethyl sulfate. The polymer is washed successively with 40 parts of water, 50 parts of 95 percent ethanol and with ether and dried. It melts at about 186° to 188° C. and is about 80 percent methylated. The polymer is laminated to aluminum as a 5 mil film at 23,000 p.s.i. and 170° C., using aluminum foil as a substrate. The film cannot be peeled from the aluminum foil.

The procedure is repeated using 80 percent of the stoichiometric amount (2.50 parts) of dimethyl sulfate (0.020 mole). An exotherm from 50° to 85° C. is noted. The product is similar to that immediately preceding in its properties. It is strongly adhesive to aluminum.

EXAMPLE 2

The procedure of Example 1 is repeated using a solution of 3 parts of polypropanesultam having inherent viscosity 0.734. Dimethyl sulfate is added at 35° C. (1.88 parts, 0.015 mole), with agitation. There is a slow exotherm to 40° C., then rapidly to 52° C. There is no precipitate. Ammonia is added to react with excess unreacted dimethyl sulfate, and then 2.5 parts of concentrated hydrochloric acid are added to precipitate the product. The product is washed as above and air dried. The product is about 60 percent methylated polypropanesultam and melts at about 190° C. On pressing at about 188° C. and 22,000 p.s.i., it gives a good clear film.

When the procedure is repeated, using extremely vigorous stirring, a more uniform distribution of alkylation over the polymer chain length is accomplished, and the melting point of the polymer, which is approximately 60 percent alkylated, is as low as about 150° C.

EXAMPLE 3

A one lb. sample of polypropanesultam (inherent viscosity 0.95) is dissolved in 7 liters of 3.5% by weight of aqueous sodium hydroxide. The solution is filtered through a nylon filter cloth using reduced pressure. The clear solution is treated with 5% aqueous hydrochloric acid, to precipitate the polymer. The polymer is filtered off and washed with four twenty gallon batches of water at 75° C. The polymer is then dried at 70° C. in vacuo, and serves as a control (lot 1) for comparison of melting points in this example, as well as for a source of polymer for alkylation in later experiments.

About 3 lbs. of polypropanesultam with inherent viscosity of 0.95 are dissolved in 8 liters of 8 percent by weight aqueous sodium hydroxide. The viscous solution is filtered through nylon filter cloth using reduced pressure, and the resultant clear solution is divided into 3 equal portions designated lots 2, 3, and 4. These lots are methylated with dimethyl sulfate at 95° C. for about one hour each and all the lots are then independently worked up by addition of sufficient of 5 percent by weight aqueous hydrochloric acid to acidify the solution (to methyl orange indicator) and precipitate the polymer. Each lot of polymer is collected and washed with 600 pounds of distilled water except lot 4, for which 1000 pounds are used. The washed polymer is then dried at 70° for 4 days in vacuo and ground to pass a 20 mesh screen in a Wiley mill. Table I shows the amounts of dimethyl sulfate employed for each lot, the apparent degree of methylation and the melting point of the polymer. The inherent viscosities of lots 1, 2 and 3 (lot 4 is insoluble in sodium hydroxide) indicate that no degradation has occurred.

*Table I*

| Lot | Pounds of dimethyl sulfate | Degree of methylation | Melting point, °C.ᵃ |
| --- | --- | --- | --- |
| 1 | 0 | 0 | 263–7 |
| 2 | 0.05 | 5 | 255–60 |
| 3 | 0.104 | 10 | 246–51 |
| 4 | 1.04 | 100 | 155–70 |

ᵃ Melting points determined by rapid heating using Fischer-Johns apparatus.

In other runs by the above procedures polymer in which about 8 percent of the nitrogen atoms are methylated is found to melt at about 245° to 252° C. It is found that methylated polypropanesultams having melting points of substantially 250° C. and lower (e.g., 8 percent or more of methyl groups) are markedly more soluble in warm dimethyl sulfoxide than is the unmethylated polymer. Most of the polymers, except those which are substantially 100 percent methylated, e.g., about 80 percent or more, are soluble in 5 percent aqueous sodium hydroxide but insoluble in dimethylformamide. Substantially 100 percent methylated polypropanesultams are soluble to about 50 percent or more by weight in dimethylformamide at 90° C. They are also soluble to 50 percent at 90° C. in hot phenol to give a clear gel on cooling, and likewise in dimethyl sulfoxide; some crystallization of the polymer from dimethylformamide and dimethylsulfoxide solutions occurred on standing.

Films of the order of 5 to 10 mil thickness are readily formed by hot pressing from the above methylated polypropanesultams having about 5, 8, 10, 15, 60, 80 and 100 percent of the nitrogen atoms methylated and are found to be clear flexible sheets. Filaments are also prepared from these polymers by extrusion under pressure to temperatures somewhat above the melting points. The films and filaments are oriented by drawing to about 300 percent at about 90° C. and the resulting oriented films and filaments are found to have good tensile strengths in the direction of drawing in the range of 10,000 to 20,000 p.s.i. for highly alkylated polymers, and upwardly to 40,000 p.s.i. or more with lower percentages of alkylation.

EXAMPLE 4

Alkylation in the process of the invention is not limited to use of dialkyl sulfates. Alkyl esters of p-toluene sulfonic acid (tosylates) and other alkylating agents are also useful and within the scope of the process of the invention. The following example illustrates the use of tosylates.

To a solution containing 1.21 parts (0.01 mole) of polypropanesultam having an inherent viscosity of 0.52, 0.40 part of NaOH (0.01 mole) and 4 parts of water, are added with stirring as above 1.86 parts (0.01 mole) of methyl tosylate. The two-phase mixture is heated to 80° C. for 2 minutes, when a cloudiness develops. After three more minutes at this temperature the mixture gels. Water (15 parts) and solid carbon dioxide are added to neutralize the sodium hydroxide and precipitate the polymer. The solid is filtered, washed with water, alcohol and ether and air dried. It melts at 134° to 137° C. After further drying over phosphorus pentoxide at 100° C. and 0.01 mm. Hg, it melts at 151° to 153° C. It appears to contain about 80 percent of the total possible methyl groups.

The same procedure is followed using 2.28 parts of butyl tosylate (0.01 mole) and heating at 80° C. Eight parts by volume of ethanol are added to the reaction mixture during 10 minutes while heating. Thereafter, addition of 8 parts by volume of dimethyl formamide followed by continued heating for 25 minutes results in partial precipitation of the partially butylated polypropanesultam. Complete precipitation follows the addition of carbon dioxide and the product is collected and washed as above, to give 1.17 parts of butylated polypropanesultam melting at 228–230° C. after thorough drying.

The products of the invention are also produced by condensation of N-halo-polypropanesultam with reactive agents as illustrated by the following example.

EXAMPLE 5

A solution containing 3.0 parts of polypropanesultam (0.025 mole) (inherent viscosity 0.42); 1.2 parts of NaOH (0.030 mole) and 9 parts of water is chilled to 0° C. Four parts of bromine (0.025 mole) are slowly added, and when half of this has been added, precipitation of brown solid begins. As addition is completed, the solid becomes finely divided and pale orange in color. The product is allowed to stand several minutes at 0° C., filtered, washed with ice water, and subjected to reduced pressure (aspirator) to remove any bromine. The product is mixed with 2.85 g. of octene-1 (0.028 mole), permitted to warm to room temperature, and is then heated to 50° C. After 3 minutes the solid becomes a viscous mass. Volatile substances are removed by warming in vacuo. The residue is washed with water, alcohol and ether. After drying, the polypropanesultam containing N-(2-bromooctyl) groups melts at about 234°–236° C.

Unsaturated compounds can be reacted directly with the sodium salt of polypropanesultam as shown in the following example without formation of the intermediate N-bromo-polypropanesultam.

EXAMPLE 6

To a solution of 6 parts of polypropanesultam (having inherent viscosity 0.38, M.P. 251–4° C.), in about 10 parts of water and 2 parts of sodium hydroxide at room temperature, are added 2 parts of acrylonitrile, whereupon a homogeneous solution is formed. To this are added 6 additional parts of acrylonitrile and an exotherm is noted. After 15 minutes the solution is turbid, and centrifugation of the turbid solution causes separation of 2 phases. The alkali is neutralized by the addition of excess solid carbon dioxide and the precipitated solid polymer is filtered off and washed with several portions of water, followed by alcohol. After drying at 100° C. over phosphorus pentoxide at 0.1 mm. Hg for one and one-half hours, the cyanoethylated polymer melts at 176°–177.5° C. The infrared absorption spectrum indicates a possible trace of NH-groups and water but otherwise is consistent with the structure of N-β-cyanoethyl-polypropanesultam (substantially 90% alkylated).

Calculated for 90% $C_6H_{10}SO_3N_2$+10% $C_3H_7SO_2N$: C, 40.2; H, 5.7; N, 15.7. Found: C, 40.2; H, 5.8; N, 15.0.

As in the case of alkylation by dialkyl sulfates, the extent of cyanoethylation is controlled by use of desired fractions of the amount of alkylating agent necessary for stoichiometric reaction.

To a solution containing 1.21 parts of polypropanesultam (0.01 mole), 0.40 part of NaOH (0.01 mole) and 10.6 parts of water is added 0.053 part of acrylonitrile (0.001 mole) with vigorous stirring as above. After 18 hours at 33° C., the mixture is diluted with 20 parts of water and treated with solid carbon dioxide. The product is recovered by centrifugation, resuspended in water and recentrifuged four times in all; it is then centrifuged from alcohol and dried, first in air and then over phosphorus pentoxide in vacuo at 100° C. The product melts at about 222°–226° C. and is about 10% cyanoethylated. During the process as thus carried out, some of the cyano groups are hydrolyzed to carboxyethyl and carbamylethyl groups. Thus, polypropanesultam which is simultaneously N-alkylated with cyanoethyl, carboxyethyl and carbamylethyl groups is obtained.

When polymer of higher molecular weight is used, similar procedures are effective but there is somewhat different behavior of the reaction mixtures as shown by the following procedures.

3.03 parts (0.025 mole) of polypropanesultam (inherent viscosity 0.842) are dissolved in a solution of 1.00 part of NaOH (0.025 mole) in 6 parts of water. Another 13 parts of water are added and to the solution are added with vigorous stirring, at about 30° C., 1.33 parts of acrylonitrile (0.025 mole). Two phases are present. After 14 minutes the solution becomes very viscous and difficult to stir. At this time an exotherm to 34° C. occurs. After about 6 minutes longer the whole has set to a gel, with a rise in temperature to 35° C. It is allowed to stand for 20 minutes and then 20 parts of water are added together with an excess of concentrated hydrochloric acid. After standing overnight the gel has coalesced into a solid which is separated by decantation. The solid is comminuted, washed with water and vacuum dried. It is ground to a powder and further washed with water and then with alcohol. After drying at 100° C./0.1 mm. over phosphorus pentoxide for 4 hours the polymer has M.P. 197°–201° C. It consists of polypropanesultam which is about 30 percent cyanoethylated.

Another solution is prepared containing 2.42 parts of the same polypropanesultam (inherent viscosity 0.842) in a solution of 0.80 part of NaOH (0.02 mole) in 20 parts of water, and 0.11 part of acrylonitrile (0.002 mole) is then added at 35° C. After one-half hour of stirring at this temperature, there is no apparent change in temperature or appearance. Another 20 parts of water and an excess of solid carbon dioxide are then added and the mixture is allowed to stand overnight. The precipitate which forms is collected and washed with 250 parts of water, followed by alcohol. It is dried over phosphorus pentoxide at 100° C./0.1 mm. Hg for 3½ hours. The product is polypropanesultam which is about 10 percent cyanoethylated.

The products of the invention are not limited to simple alkyl groups, since, as shown above, a cyanoethyl group may be introduced. In general, any alkyl-group-containing groups or substituents which are not deleteriously affected by the conditions of reaction can be introduced and it will be within the ordinary skill of the art to recognize slight modifications in procedure and reactants for the production of such N-(substituted alkyl)polypropanesultams. The following examples serve to illustrate some of the permissible variations in substituents on the alkyl groups wihch are within the scope of the invention.

EXAMPLE 7

A solution of 1.50 parts (0.0125 mole) of polypropanesultam having inherent viscosity 0.658 in 4 parts of water containing 0.60 part of sodium hydroxide is stirred at high speed while 1.92 parts (0.0125 mole) of methyl bromoacetate are added. There appears to be no exotherm but after one minute a white solid begins to separate and the mixture rapidly solidifies. Stirring is stopped and after several minutes the mixture is acidified with concentrated hydrochloric acid and filtered. The solid N-carbomethoxymethylated polymer is washed with 100 parts of water, 50 parts of alcohol and finally with ether and air dried. It then has M.P. about 230–240° C. After further drying over phosphorus pentoxide at 100° C./0.1 mm. Hg for several hours, the polymer melts at about 236–245° C.

When subjected to hydrolytic conditions, the product undergoes saponification of the ester group so that free acid groups are present distally in the N-alkyl groups, thus forming carboxymethylated polypropanesultam. If the hydrolysis is stopped at an intermediate stage both carbomethoxymethyl and carboxymethyl groups are present on the polypropanesultam chain.

EXAMPLE 8

Ethylene oxide (0.88 part) is condensed by cooling in a solution of 1.21 parts of polypropanesultam (inherent viscosity 0.60) (0.01 mole) in 20 parts of water containing 0.4 part of sodium hydroxide. The resulting mixture, which becomes clear after 35 minutes, again separates into two phases after 90 minutes and is stirred for about 20 hours at room temperature. The lower, denser phase is treated with solid carbon dioxide and then is washed with water, alcohol and ether. The oily, water-dispersible hydrophilic polymeric product is dried. Infrared absorption spectroscopy shows the presence of ether groups, confirming that the product contains substituted alkyl groups of the class of polyethylene oxide groups such as:

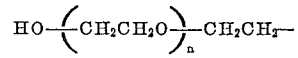

attached to the nitrogen atoms in the polypropanesultam chain. In this case $n$ averages one.

A 10% solution of ethylene oxide in water is formed by condensing 1 gram of this material in 9 grams of cold distilled water. 2.7 grams of this solution are added to a solution of 3.63 grams of polypropanesultam (0.03 mole; $[\eta]=0.9$) in 15.8 grams of water containing 1.2 grams of sodium hydroxide. The mixture is stirred for 22 hours at room temperature. Thereafter, the polymer is precipitated by adding solid carbon dioxide. The precipitate is removed by filtration, the filter cake is broken up and washed thoroughly with alcohol and water, and dried in vacuo for 18 hours. A hard polymer is obtained, melting at 216–219° C., consisting of about 20% hydroxyethylated polypropanesultam.

When the procedure is repeated using 5.3 grams of 10% ethylene oxide solution, the product is about 40% hydroxyethylated polypropanesultam and melts at about 169–170° C.

If desired, and this is convenient since reaction in anhydrous media is sometimes desirable, it is possible to form the dry sodium salt or other salt of polypropanesultam and subsequently to react this with a suitable alkylating agent. The reaction mixture is treated with a dilute acid such as aqueous hydrochloric acid or carbon dioxide in aqueous media to reconvert unreacted sites to the sulfonamide form following alkylation. The following example shows two methods for isolation of the salts and reactions thereof to produce substituted alkylated polypropanesultams.

EXAMPLE 9

One part of the sodium salt of polypropanesultam is mixed with about 10 parts of allyl chloride and the suspension is refluxed for about 17 hours. The mixture is then cooled and stirred with dilute aqueous hydrochloric acid. The mixture is filtered and the precipitate is washed with ether, water, and alcohol. The resultant allylated polymer melts at 231°–233° C. It consists of N-allyl polypropanesultam which is approximately 8 percent alkylated.

EXAMPLE 10

A solution containing 1.21 parts of polypropanesultam, 0.40 part NaOH and 5 parts of water is frozen into a shell inside a round-bottomed flask. The flask is connected to a freeze-drying apparatus and held for 5 hours. The dry salt thus formed is mixed with 2.77 parts of 1-bromotetradecane and the mixture is refluxed at 130° C. for one hour. About 10 parts of dimethyl formamide are added and the refluxing is continued for 21 hours. At this time the crust of sodium polypropanesultam has dissolved and a solid (probably sodium bromide) has separated. On cooling and standing for two hours, the solution deposits a gel, more of which is precipitated by the addition of 30 parts of water, while the solid dissolves. Separation and washing with water, alcohol and ether, and drying over phosphorus pentoxide at 100° C./0.1 mm. Hg yields N-tetradecyl polypropanesultam, M.P. 193°–205° C. The polymer contains about 50 percent of tetradecyl groups.

EXAMPLE 11

A solution is prepared by dissolving 2.42 grams of polypropanesultam in 30 parts of tetramethylammonium hydroxide, by heating the mixture to 80° C. The solution is then cooled to about 38° C., and 5.06 grams (a twofold excess) of benzyl chloride are added. The reaction mixture is stirred for about four minutes, and heated to about 55° C. A gel-like precipitate forms. The mixture is then stirred and heated for an additional five-minute period at 80° C., whereupon the precipitated gel becomes more powdery. The reaction mixture is cooled to about 40° C., and 30 parts of water and an excess of solid carbon dioxide is added thereto. The resulting precipitate is removed by filtration, washed with water, alcohol and ether. After air drying for 45 minutes to remove the ether, the precipitated polymer is dried in vacuo at 70° C. for two hours. The N-benzylated polypropanesultam thus prepared melted at about 234°–237° C. The polymer is substantially 100 percent benzylated, as shown by the infrared analysis which discloses the absence of =NH absorption.

A solution of 0.007 mole partially methylated polypropanesultam (M.P. 218°; about 20% methylated) in 2 N aqueous sodium hydroxide is heated with 0.0055 mole of benzyl chloride at 80° C. for 20 minutes. The resultant polymer is substantially completely alkylated: about 20% with methyl groups and about 60 to 80% with benzyl groups. It melts 181° to 193° C. By a similar procedure employing 50% methylated polypropanesultam a polymer having additionally about 40 to 50% benzyl groups is obtained which melts 168° to 175° C.

EXAMPLE 12

A solution of 2.42 grams of polypropanesultam in 25 ml. of 10 percent tetramethyl ammonium hydroxide in water is diluted with 30 parts of ethanol, which produces an homogeneous solution at room temperature. While stirring, 2.58 grams of methyl acrylate are added to the solution. The resulting mixture is homogeneous and darkens immediately to a brown color, without exotherm. The reaction mixture is then stirred for 20 hours at room temperature, and thereafter is made slightly acid with concentrated hydrochloric acid. A rubbery mass of polymer thereupon separates from the solution. The rubbery product is repeatedly washed with water, alcohol and water, in that order. The polymer thus obtained is dried in vacuo for 2 hours at room temperature and then for 2 hours at 40° C. During the process the color changes from white to light tan. The carbomethoxyethyl polypropanesultam thus obtained melts at about 97°–104° C., and is about 60 percent alkylated.

The material obtained is a rubbery solid, which can be hot pressed to form a snappy elastic film.

Similarly other alkylating agents are employed using 20 ml. of aqueous solution containing 0.01 mole of the tetramethyl ammonium salt of polypropanesultam (formed from stoichiometric amounts of the quaternary ammonium hydroxide and polypropanesultam) with the alkylating agents for the times and at the temperatures shown in the following table. The melting points and approximate extent of alkylation are also shown.

Table III

| Alkylating agent | Time (hrs.) | Temp. (° C.) | Product M.P. (° C.) | Product Percent alkylation |
|---|---|---|---|---|
| Benzyl chloride a | 1 | 80 | 166–171 | 40–50 |
| Cinnamyl chloride b c | 0.33 | 80 | 163–169 | 50 |
| 3-(phenyl)-propyl bromide b | 19 | 80 | 124–134 | 60 |
| n-butyl tosylate b | 19 | 80 | 146–149 | 50 | a Using half molar proportions.
b Using equimolar proportions.
c Product is light-sensitive.

EXAMPLE 13

A film about 10 mils thick, made by hot pressing a 10 percent methylated polypropanesultam prepared by the procedures set forth hereinabove, is further alkylated on its surface as follows:

A strip of the film is first wipe-coated with tetramethylguanidine, and then immediately thereafter wipe-coated with methyl acrylate. The coated film is heated by directing steam upon the under surface thereof for about 10 to 20 seconds. An immediate reaction occurs, the coated surface becoming partially opaque. Thereafter, the reaction on treated surface is quenched by holding it under running water and then immersing in alcohol. On drying, it is found that the treated side has a rubbery coating which is tenaciously held and cannot peel off. The untreated side remains smooth and shiny. The film is slightly less transparent than originally, owing to the treated surface.

EXAMPLE 14

This example illustrates the process of the invention as carried out in dimethylsulfoxide.

To a solution of 1.21 parts of polypropanesultam and 6.85 parts of anhydrous dimethylsulfoxide are added 2.22 parts (50 mole percent excess) of phenyl acrylate and the mixture is refluxed at 120° C. for 4 hours. The product is recovered by pouring the reaction product into an excess of water and recovering and drying the polymer which contains about 75 percent of the amide groups substituted by phenyl propionate residues. The polymer melts very widely softening at about 160° C. and melting from about 221° to 265° C.

The procedure is repeated employing the same preparation of 2-chloroethyl acrylate at 125° C. for 4 hours to produce polypropanesultam having a portion of the amide groups substituted by 2-chloroethylpropionate residues (polymer softens 205° C., melts about 244° to 248° C.).

The procedure is repeated employing the same proportion of allyl acrylate at 110° C. for 4 hours to obtain polymer melting at about 240° to 266° with decomposition having about 8 percent of the amide group substituted by allyl propionate groups or cross linked.

EXAMPLE 15

Some reactive alkylating agents can be employed in dimethylsulfoxide without the use of a base. Thus, 0.01 mole of polypropanesultam and 0.015 mole of methyl acrylate are heated in 6 parts of anhydrous dimethylsulfoxide at 75° C. for 1 hour to give a rubbery about 50% alkylated polypropanesultam.

The process is repeated employing 0.02 mole of formaldehyde at 85° C. for 3 hours and rubbery, 70 percent methylolated polypropanesultam is obtained.

By reaction with 0.02 mole of acrylonitrile with 0.01 mole of polypropanesultam at 80° C. for 20 hours, substantially 100% cyanomethylated polypropanesultam is obtained. This material is readily molded to a flexible film.

When dimethylsulfoxide is employed as a solvent, the products are preferably washed with dilute aqueous acid followed by water, to remove the dimethylsulfoxide as completely as possible, as well as any basic salts present.

EXAMPLE 16

Polypropanesultam is acetylated in anhydrous dimethylsulfoxide using pyridine as the base. A mixture of 1.21 parts of polypropanesultam and 1.02 parts of acetic anhydride (equimolar proportions) in 6.85 parts of dimethyl sulfoxide containing 0.80 part of pyridine is heated at 84° C. for 2 hours and quenched in water. The polymer is recovered as in the above examples and dried. It is N-acetylated to about 50% and melts at about 171° to 183° C.

The same procedure is applied to benzoyl chloride heating for 3 hours at 90° to give 10% N-benzoylated polypropanesultam melting at 240° to 243° C.

In general the same procedure is used for other acid anhydrides and halides employing longer times, for example, 5 to 6 hours and higher temperatures for less reactive halides and anhydrides such as butyric anhydride, caproyl chloride, cinnamoyl chloride and the like to produce the respective N-acylated polypropanesultams.

EXAMPLE 17

Additions to polypropanesultam are readily carried out in anhydrous dimethylsulfoxide. The solubility in dimethylsulfoxide is about 25 percent at 80° C.; the solution gels on cooling.

To 10.9 parts of dimethylsulfoxide containing 1.21 parts of polypropanesultam are added 0.27 part of acrylonitrile and the mixture is heated for 3.5 hours at 70° C. The product is worked up as above.

The same general procedure is employed on other alkylating agents at various ratios of alkylating agent to polypropanesultam for different times and temperatures. The resultant products are correspondingly N-alkylated polypropanesultams. The figures shown in the following table indicate the results obtained.

Table IV

| Alkylating agent | Moles | Time (hrs.) | Temperature (° C.) | Product | |
|---|---|---|---|---|---|
| | | | | M.P., ° C. | Percent alkylation |
| Acrylonitrile | .005 | 3.5 | 70 | 164–172 | 40 |
| 2-cyanoethoxyethyl a acrylate | .011 | 3.5 | 80 | rubbery | 50 |
| Vinyl methacrylate | .02 | 3 | 90 | 237–244 | 10 |
| Do | .032 | 5 | 97 | 225–242 | 15 |
| Cinnamyl acrylate | .018 | 5 | 98 | 241–244 | 5–10 |
| Do | .02 | 0.4 | 90 | 246–249 | 5 |
| Cinnamyl methacrylate | .016 | 1.75 | 95 | 227–231 | 15 |
| Do | .02 | 6 | 85 | 235–243 | 10 | a In 6.85 parts of dimethylsulfoxide.

EXAMPLE 18

Some alkylating agents are hydrolyzed by aqueous alkali but can be utilized by reaction with the tetramethyl ammonium salt of polypropanesultam in ethanolic solution. Other lower alkyl quaternary ammonium salts can also be employed. The quaternary salt is formed in water using stoichiometric amounts of the quaternary ammonium hydroxide and polypropanesultam and the solution is evaporated in a rotary evaporator to a glass which is taken up in alcohol and employed for the reaction. The results of a number of reactions using different alkylating agents with tetramethylammonium polypropanesultam are shown in the following table.

Table V

| Alkylating agent | Moles | Moles, 4° salt | Temp., ° C. | Time (hrs.) | Product | |
|---|---|---|---|---|---|---|
| | | | | | M.P., ° C. | Percent alkylation |
| Benzyl chloride | .05 | .05 | 37 | 1 | 238–42 | 5 |
| Do | .04 | .04 | 80 | .25 | 208–17 | >4 |
| p-Xylylene dichloride | .0015 | .03 | 80 | 1.5 | 239–42 | 5 |
| Do | .003 | .012 | 80 | 1 | a dec. 274 | 25 |
| p-Nitro benzyl chloride | .02 | .012 | 80 | 4 | 158–73 | 44 |
| Allyl chloride | .04 | .012 | 80 | 19 | 116–9 | 100 |
| Methyl acrylate | .0124 | .012 | 80 | 2.5 | 184–96 | b ~100 | a Extensively cross-linked.
b Forms elastic film adherent to aluminum.

I claim:

1. Polypropanesultam in which each of from about 5 to 100 percent of the hydrogen atoms upon the nitrogen atoms in the chain thereof has been replaced by an alkyl radical having up to 18 carbon atoms.

2. Polypropanesultam in which each of from about 5 to 100 percent of the hydrogen atoms upon the nitrogen atoms in the chain thereof has been replaced by a radical having up to 18 carbon atoms selected from the group consisting of unsubstituted aliphatic hydrocarbon, alkenyl, cyanoalkyl, hydroxyalkyl, hydroxyalkoxyalkyl, carboxyalkyl, carboalkoxyalkyl, haloalkyl, aralkyl and nitroaralkyl radicals.

3. Polypropanesultam in which each of from about 5 to 50 percent of the hydrogen atoms upon the nitrogen atoms in the chain thereof has been replaced by a radical having up to 18 carbon atoms selected from the group consisting of unsubstituted aliphatic hydrocarbon, alkenyl, cyanoalkyl, hydroxyalkyl, hydroxyalkoxyalkyl, carboxyalkyl, carboalkoxyalkyl, haloalkyl, aralkyl and nitroaralkyl radicals, and at least a portion of the remaining hydrogen atoms has been replaced by a different radical selected from the same group.

4. Polypropanesultam in which each of from about 5 to 100 percent of the hydrogen atoms attached to the nitrogen atoms in the chain thereof have been replaced by methyl groups.

5. Polypropanesultam in which each of from about 5 to 100 percent of the hydrogen atoms attached to the nitrogen atoms in the chain thereof have been replaced by cyanoethyl groups.

6. Polypropanesultam in which each of from about 5 to 100 percent of the hydrogen atoms attached to the nitrogen atoms in the chain thereof have been replaced by carboxyethyl groups.

7. Polypropanesultam in which each of from about 5 to 100 percent of the hydrogen atoms attached to the nitrogen atoms in the chain thereof have been replaced by carbomethoxy ethyl groups.

8. Polypropanesultam in which each of from about 5 to 100 percent of the hydrogen atoms attached to the nitrogen atoms in the chain thereof have been replaced by allyl groups.

9. Polypropanesultam in which each of from about 5 to 100 percent of the hydrogen atoms attached to the nitrogen atoms in the chain thereof have been replaced by hydroxyethoxyethyl groups.

10. Polypropanesultam in which each of from about 5 to 100 percent of the hydrogen atoms attached to the nitrogen atoms in the chain thereof have been replaced by benzyl groups.

11. Polypropanesultam in which each of from about 5 to 100 percent of the hydrogen atoms attached to the nitrogen atoms in the chain thereof have been replaced by hydroxyethyl groups.

12. Polypropanesultam in which each of from about 5 to 100 percent of the hydrogen atoms attached to the nitrogen atoms in the chain thereof have been replaced by cinnamyl groups.

13. Modified polypropanesultam having numerically from 5 to 100 percent of N-alkyl sulfonamide linkages in the chain, the N-alkyl groups containing up to 18 carbon atoms and, when substituted, being devoid of elements other than at least two and not more than three of hydrogen, oxygen, nitrogen and halogens of which at least one is hydrogen; each carbon atom to which oxygen and nitrogen are attached having an odd number of valences directed to the total of those elements to which it is attached; each halogen being bonded exclusively to carbon; no nitrogen in said alkyl group being attached to more than one carbon atom by single valences; each nitrogen to which oxygen is attached being attached to two oxygen atoms; and there being no more than four unsaturations in each of said alkyl groups and, when more than one, at least three forming a conjugated structure in a ring of six carbon atoms.

References Cited by the Examiner

UNITED STATES PATENTS

| | | | |
|---|---|---|---|
| 2,515,173 | 7/50 | Ackerman et al. | 260—78 |
| 2,983,713 | 5/61 | Libby | 260—78 |
| 2,989,364 | 6/61 | Goldann | 260—78 |
| 2,998,295 | 8/61 | Goldann | 260—78 |
| 3,035,028 | 5/62 | Wheelock | 260—78 |

FOREIGN PATENTS 810,356   3/59   Great Britain.

WILLIAM H. SHORT, *Primary Examiner.*

JOSEPH R. LIBERMAN, *Examiner.*